W. R. GREEN.
WIRE STRETCHER.
APPLICATION FILED SEPT. 18, 1911.
1,171,784.
Patented Feb. 15, 1916.
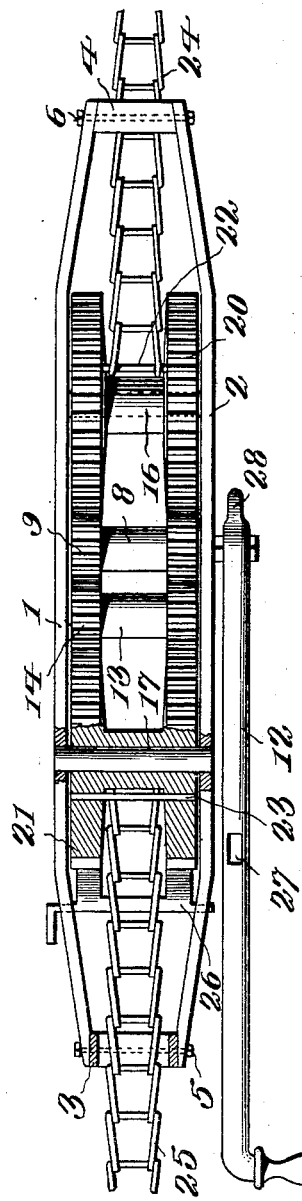
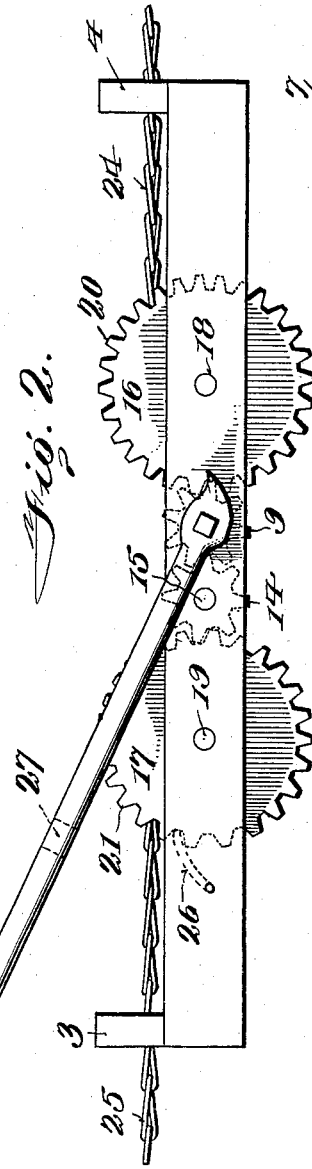
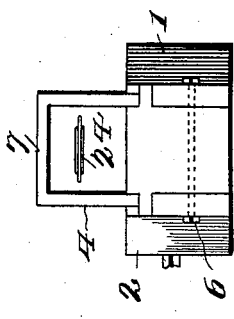
Inventor
W. Roy Green
Witnesses
By
Attorneys
THE COLUMBIA PLANOGRAPH CO., WASHINGTON, D. C.

UNITED STATES PATENT OFFICE.

WILLIAM ROY GREEN, OF FOLSOM, NEW MEXICO.

WIRE-STRETCHER.

1,171,784.   Specification of Letters Patent.   Patented Feb. 15, 1916.

Application filed September 18, 1911. Serial No. 650,008.

*To all whom it may concern:*

Be it known that I, WILLIAM ROY GREEN, a citizen of the United States, residing at Folsom, in the county of Union and State of New Mexico, have invented certain new and useful Improvements in Wire-Stretchers; and I do hereby declare the following to be a full, clear, and exact description, such as will enable others skilled in the art to which it appertains to make and use the same.

This invention relates to wire stretchers and splicers, being directed particularly to a readily portable type of the same adapted when in operation to be either anchored to a post or other convenient object or manually supported by the operator.

One object of the invention is the production of a device of the above-mentioned character which will effectively stretch a fence or other wire and maintain the same in taut condition without aid from the operator while the wire is being anchored and which is constructed to readily permit the splicing operation when desired.

Another object is to produce a stretcher and splicer which, as a result of its simplified construction including a minimum of parts is little liable to require repair, is adapted, should occasion present itself, to be quickly and easily taken apart and as readily reassembled.

With these and other objects in view the invention will now be described in the following specification, taken in connection with the accompanying drawings and then more particularly pointed out in the appended claim.

In the drawings, Figure 1 is a broken plan, partly in section, of my improved stretcher and splicer. Fig. 2 is a side elevation of the same. Fig. 3 is an end elevation of the device shown without the operating drums or handle, and Fig. 4 is a side elevation, partly in section, illustrating the means of connecting one of the drums to its shaft.

Referring now to the drawings, wherein is shown the details of the preferred form of my invention and wherein similar reference characters refer to like parts throughout the several views, 1 and 2 denote side bars of the frame formed of appropriate material and proportions and spaced by end braces 3 and 4, the parts of the frame as a whole being rigidly and removably connected by means of threaded bolts 5 and 6. Said end braces project above the horizontal plane of the side bars 1 and 2 in the form of U-shaped extensions 7, as shown in Fig. 3.

8 denotes a spool-like gearing provided on its flanges with gear teeth 9 and keyed to its shaft 10 which is removably journaled in side bars 1 and 2, by a wedge-shaped key 11, as shown in Fig. 4. Said shaft projects beyond side bar 2 of the frame and is provided with a squared end, over which fits a squared aperture in an operating handle 12, to provide for positive action of the spool 8 in operating the device.

13 denotes a spool-like gearing formed with gear-toothed flanges 14 similar in form and dimensions to spool 8 and journaled on shaft 15, the latter bearing in the side bars 1 and 2, spools 8 and 13 being so relatively positioned as to permit, in the revolution of said spools, meshing of their toothed flanges.

16 and 17 denote drums removably supported for revolution between side bars 1 and 2 by shafts 18 and 19 respectively journaled in said bars, the drums being provided on their flanges with gear teeth 20 and 21 and positioned to cause meshing engagement of said teeth with the gear teeth on flanges of spools 8 and 13 respectively when the apparatus is being operated.

22 and 23 denote anchor pins fixedly secured in drums 16 and 17 and extending transversely thereof from flange to flange of said drums and designed to anchor the inner ends of grip chains 24 and 25 respectively passing through the U-shaped extensions of the end braces 3 and 4.

26 indicates a locking-pawl journaled in the frame side bars, said pawl being adapted to engage the teeth of drum 17 and hold it, and through it the other gears, against revolution in one direction for the purpose of maintaining the wire being manipulated in the taut relation secured.

27 indicates a splicing aperture formed in the operating handle 12 the functional employment of which will be later explained. The end of the operating handle 12 is formed into a staple puller 28 for ready use in extracting the staples employed to attach, in the instance of a fence wire being handled, said wire to the posts when desired to re-position the staples.

In operation, assuming that it is desired to remove the slack in a fence wire, one of the grip chains, as 24, is securely fastened to one of the fence posts and the other chain attached to the wire to be stretched when, as obvious, on turning handle 12 chain 25 will wrap on drum 17 and draw the wire toward the stretcher. When the wire has been drawn sufficiently taut the locking-pawl 26 is thrown into engagement with gear teeth of drum 17 thus preventing revolution of the gears in a direction reverse to that of the winding movement and maintaining the wire taut until it can be secured in desired position on a post. In the operation of splicing, two sections of wire the chains 24 and 25 are secured to said sections respectively a sufficient distance from the ends thereof to insure, when the device is operated and the sections drawn toward each other, that the ends of the sections will overlap sufficiently to form the splice. When the ends of the sections have been drawn to overlapped position, the locking-pawl is operated to hold them in such relation, handle 12 disengaged from shaft 10 and the ends of the wire sections assembled and passed through aperture 27 in said handle which is then revolved, resulting in turning the said ends one upon the other and forming an effective twist splice, the handle being then slipped from the twisted ends forming the splice and returned to operative connection with the stretcher.

From the foregoing it will be seen that I have provided a simple, effective stretcher and splicer adapted to maintain a stretched wire in taut condition without aid from the operator while the latter has the use of both hands to anchor or splice the wire, the device being also adapted for ready disengagement of the several parts and as ready assembling should occasion arise for repair.

Having thus described my invention, what I claim as new and desire to secure by Letters Patent, is:—

A wire stretcher including a frame, comprising side bars, removable braces spacing the side bars and projected thereabove to form chain guides, shafts removably journaled in the frame, a plurality of geared drums adapted for revolution and mounted on said shafts, anchor pins carried by the drums, a handle mounted on one of the shafts for revolving the drums, removable tying bolts detachably connecting the ends of the side bars and the braces and adapted to maintain the frame and drums in assembled operative position, and chains connected to said anchor pins and passing through the respective guides, the guides being of such dimensions that the chains are maintained in approximate alinement.

In testimony whereof I affix my signature in presence of two witnesses.

W. ROY GREEN.

Witnesses:
C. J. DUNSHEE,
LUCILE E. ATWATER.

Copies of this patent may be obtained for five cents each, by addressing the "Commissioner of Patents, Washington, D. C."